United States Patent
Shu et al.

(10) Patent No.: US 9,854,480 B2
(45) Date of Patent: Dec. 26, 2017

(54) METHOD FOR SELECTING LONG TERM EVOLUTION LTE NETWORK AND DEVICE

(71) Applicant: HUAWEI TECHNOLOGIES CO., LTD., Shenzhen (CN)

(72) Inventors: Lin Shu, Shanghai (CN); Xiaobo Wu, Shanghai (CN); Ye Zou, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/196,364

(22) Filed: Jun. 29, 2016

(65) Prior Publication Data

US 2016/0309374 A1 Oct. 20, 2016

Related U.S. Application Data

(63) Continuation of application No. PCT/CN2013/091070, filed on Dec. 31, 2013.

(51) Int. Cl.
*H04W 36/00* (2009.01)
*H04W 36/14* (2009.01)
(Continued)

(52) U.S. Cl.
CPC ....... *H04W 36/0022* (2013.01); *H04W 36/14* (2013.01); *H04W 60/00* (2013.01); *H04W 80/04* (2013.01)

(58) Field of Classification Search
CPC ....... H04W 36/30; H04W 60/00; H04W 8/12; H04W 80/04
(Continued)

(56) References Cited

U.S. PATENT DOCUMENTS 8,577,365 B2 * 11/2013 Tanaka ............... H04W 8/12
370/331
9,497,665 B2 * 11/2016 Wu .................. H04W 36/0022
(Continued)

FOREIGN PATENT DOCUMENTS

CN 102388651 3/2012
CN 102883412 A 1/2013
(Continued)

OTHER PUBLICATIONS

International Search Report and Written Opinion dated Oct. 10, 2014 in corresponding International Patent Application No. PCT/CN2013/091070.
(Continued)

*Primary Examiner* — Danh Le
(74) *Attorney, Agent, or Firm* — Staas & Halsey LLP

(57) ABSTRACT

The present invention relates to the field of communications technologies and discloses a method for selecting an LTE network and a device, so as to ensure continuity of a PS service, avoid unnecessary inter-PLMN handover, and improve user experience. The method mainly includes: acquiring, by an MSC/VLR, an identity of an LTE PLMN in which UE is registered, where the MSC/VLR is an MSC/VLR after the UE falls back to a 2G/3G network because of performing a CS service; and sending, by the MSC/VLR, a notification message to the UE, where the notification message includes the identity of the LTE PLMN, which is used to indicate the LTE PLMN that the UE returns to, and the LTE PLMN is used as a registered PLMN in the 2G/3G network. Embodiments of the present invention are mainly used in a process of fallback to an LTE network after a CSFB service ends.

18 Claims, 4 Drawing Sheets

(51) Int. Cl.
*H04W 80/04* (2009.01)
*H04W 60/00* (2009.01)

(58) Field of Classification Search
USPC .................. 455/436, 435.1, 433; 370/331
See application file for complete search history.

(56) References Cited

U.S. PATENT DOCUMENTS

| | | | |
|---|---|---|---|
| 2010/0317315 A1 | 12/2010 | Burbidge et al. | |
| 2013/0100932 A1 | 4/2013 | Yu et al. | |
| 2013/0136115 A1 | 5/2013 | Moisanen et al. | |
| 2015/0156687 A1* | 6/2015 | Wu | H04W 36/0083 455/436 |
| 2015/0163702 A1* | 6/2015 | Wu | H04W 36/0022 370/331 |
| 2015/0312809 A1* | 10/2015 | Shu | H04W 36/0022 370/331 |
| 2016/0057661 A1* | 2/2016 | Nayak | H04W 36/0022 370/331 |
| 2016/0134316 A1* | 5/2016 | Mohan | H04W 8/22 455/558 |
| 2016/0142969 A1* | 5/2016 | Hedman | H04W 36/0022 370/331 |
| 2016/0309439 A1* | 10/2016 | Wu | H04W 8/02 |
| 2017/0070877 A1* | 3/2017 | Shi | H04W 8/183 |
| 2017/0074461 A1* | 3/2017 | Yen | F21K 9/17 |
| 2017/0086042 A1* | 3/2017 | Oh | H04W 4/14 |

FOREIGN PATENT DOCUMENTS

| | | |
|---|---|---|
| WO | WO 2010/106397 A1 | 9/2010 |
| WO | WO2013129994 | 9/2013 |

OTHER PUBLICATIONS

"How to return to LTE for CSFB", SA WG2 Meeting #95, Huawei, Hisilicon, Yota, S2-130360, Jan. 28-Feb. 1, 2013, Prague, Czech Republic, pp. 1-4.

"3rd Generation Partnership Project; Technical Specification Group Services and System Aspects; Circuit Switched (CS) fallback in Evolved Packet System (EPS); Stage 2 (Release 12)", 3GPP TS 23.272 V12.1.0, 3GPP Organizational Partners, Dec. 2013, Valbonne, France, pp. 1-100.

International Search Report dated Oct. 10, 2014, in corresponding International Application No. PCT/CN2013/091070.

Change Request: Network sharing impact on the CSFB, 3GPP TSG SA WG2 Meeting #92, S2-122769, Jul. 9-13, 2012—Barcelona, Spain.

Office Action, dated Oct. 30, 2017, in Chinese Application No. 201380002766.7 (16 pp.).

\* cited by examiner

METHOD FOR SELECTING LONG TERM EVOLUTION LTE NETWORK AND DEVICE

CROSS-REFERENCE TO RELATED APPLICATIONS

This application is a continuation of International Patent Application No. PCT/CN2013/091070 filed on Dec. 31, 2013, which is hereby incorporated by reference in the entirety.

TECHNICAL FIELD

The present invention relates to the field of communications technologies, and in particular, to a method for selecting a Long Term Evolution (LTE) network after a circuit switched (CS) service ends, and a device.

BACKGROUND

A circuit switched (CS) network is a wireless network that provides a circuit switched domain service such as a voice call. A 2nd Generation/3rd Generation 2G/3G) network such as GSM and WCDMA has a wide coverage. Meanwhile, with development of network technologies, a packet switched (PS) network specially providing a data service, for example, a Long Term Evolution (LTE) network, is also deployed on a large scale. Therefore, in a current communications network, the CS network and the PS network coexist, and an operator may provide a circuit switched domain service for a user by using the 2G/3G network and provide a data service for the user by using the LTE network.

Based on the network coverage manner, a 3rd Generation Partnership Project (3GPP) organization puts forward a "circuit switched fallback" (CS Fallback, CSFB) technology, so that when needing to process a CS service, user equipment (UE) that is registered in an LTE network falls back to a CS domain of a 2G/3G network to complete service processing. After the CS service is completed, an existing protocol further defines a CSFB fallback mechanism, so as to ensure that after completing the CS service, the UE can return to the PS network to perform a PS service. The CSFB fallback mechanism specifically includes: a mobile switching center (MSC)/visitor location register (VLR) releases a connection established for the CS service, and indicates to a base station that the current connection is established for CSFB. When releasing the connection, the base station instructs the UE to obtain LTE frequency band (Frequency) information of the LTE network by reselecting, so that after redirected to a suitable cell supporting the LTE frequency band information, the UE randomly selects an available LTE public land mobile network (PLMN) in broadcast information of the suitable cell.

In a process of implementing the foregoing fallback to the LTE network, the inventor finds that the prior art has at least the following problems: A data service suspended in an LTE PLMN in which registration is performed before CSFB is triggered cannot be restored, which results in termination of an on-going data service and unnecessary inter-PLMN handover, and affects service experience of a user.

SUMMARY

Embodiments of the present invention provide a method for selecting an LTE network and a device, so that after a CSFB service ends, UE may return to an LTE PLMN in which the UE is registered when CSFB is initiated, so as to ensure continuity of a PS service, avoid unnecessary inter-PLMN handover, and improve user experience.

To achieve the foregoing objective, the following technical solutions are used in the embodiments of the present invention.

A first aspect of the present invention provides a method for selecting a Long Term Evolution LTE network, including:

sending, by a mobile switching center/visitor location register MSC/VLR, a notification message to user equipment UE, where the notification message includes an identity of an LTE public land mobile network PLMN in which the UE is registered, and the MSC/VLR is a first MSC/VLR after the UE initiates a circuit switched fallback CSFB service in the LTE PLMN and falls back to a 2nd Generation/3rd Generation 2G/3G network; and the notification message is used to instruct the UE to select the LTE PLMN according to the identity of the LTE PLMN in the notification message after the CSFB service ends.

With reference to the first aspect of the present invention, in a first possible implementation manner, the notification message includes a first notification message that includes a location area identity LAI, where the LAI includes the identity of the LTE PLMN in which the UE is registered, and the LAI is used to instruct the UE to select the LTE PLMN according to the identity of the LTE PLMN in the LAI after the CSFB service ends.

With reference to the first aspect of the present invention, in a second possible implementation manner, the notification message includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to either of the foregoing possible implementation manners of the first aspect of the present invention, in a third possible implementation manner, the notification message includes a mobility management message.

With reference to the third possible implementation manner of the first aspect of the present invention, in a fourth possible implementation manner, the mobility management message includes a temporary mobile subscriber identity TMSI reallocation message, a location update accept message, or a mobility management information message.

With reference to any one of the foregoing possible implementation manners of the first aspect of the present invention, in a fifth possible implementation manner, the MSC/VLR sends the notification message to the UE in any one of the following cases:

after a CS signaling connection is established; or in a process in which a CS service is performed; or after a CS service ends and before a CS signaling connection is released.

With reference to the fifth possible implementation manner of the first aspect of the present invention, in a sixth possible implementation manner, if the MSC/VLR receives, in a fallback process of the CSFB service, a location update process initiated by the UE, the MSC/VLR sends the notification message to the UE after the location update process is completed.

With reference to any one of the foregoing possible implementation manners of the first aspect of the present invention, in a seventh possible implementation manner, the notification message further includes an equivalent public land mobile network EPLMN list, and a PLMN in the EPLMN list is a PLMN equivalent to the LTE PLMN in the notification message.

A second aspect of the present invention provides a method for selecting a Long Term Evolution LTE network, including:

initiating, by user equipment UE, a circuit switched fallback CSFB service in an LTE public land mobile network PLMN in which the UE is registered and falling back to a 2nd Generation/3rd Generation 2G/3G network;

receiving, by the UE in the 2G/3G network, a notification message sent by an MSC/VLR, where the notification message includes an identity of the LTE PLMN in which the UE is registered; and after the circuit switched fallback CSFB service ends, selecting, by the UE, the LTE PLMN according to the identity of the LTE PLMN in the notification message.

With reference to the second aspect of the present invention, in a first possible implementation manner, the notification message includes a first notification message that includes a location area identity LAI, where the LAI includes the identity of the LTE PLMN in which the UE is registered.

With reference to the first possible implementation manner of the second aspect of the present invention, in a second possible implementation manner, after the receiving, by the UE in the 2G/3G network, a notification message sent by an MSC/VLR, the method further includes:

saving, by the UE, the LAI in the notification message, and using an LTE PLMN in the LAI as a registered PLMN.

With reference to the second possible implementation manner of the second aspect of the present invention, in a third possible implementation manner, the saving, by the UE, the LAI in the notification message includes:

if the UE already stores an old LAI, replacing, by the UE, the old LAI with the LAI in the notification message.

With reference to the first possible implementation manner of the second aspect of the present invention, in a third possible implementation manner, the notification message includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to the third possible implementation manner of the second aspect of the present invention, in a fourth possible implementation manner, after the receiving, by the UE in the 2G/3G network, a notification message sent by an MSC/VLR, the method further includes:

saving, by the UE, the identity of the LTE PLMN in the notification message, and using the LTE PLMN in the notification message as a registered PLMN according to the indication information.

With reference to the fourth possible implementation manner of the second aspect of the present invention, in a fifth possible implementation manner, the saving, by the UE, the identity of the LTE PLMN in the notification message includes:

if the UE already stores an identity of an old LTE PLMN, replacing, by the UE, the identity of the old LTE PLMN with the identity of the LTE PLMN in the notification message.

With reference to any one of the foregoing possible implementation manners of the second aspect of the present invention, in a sixth possible implementation manner, the notification message includes a mobility management message.

With reference to the sixth possible implementation manner of the second aspect of the present invention, in a seventh possible implementation manner, the mobility management message includes a temporary mobile subscriber identity TMSI reallocation message, a location update accept message, or a mobility management information message.

With reference to any one of the foregoing possible implementation manners of the second aspect of the present invention, in an eighth possible implementation manner, the notification message further includes an equivalent public land mobile network EPLMN list, and a PLMN in the EPLMN list is a PLMN equivalent to the LTE PLMN in the notification message.

With reference to the eighth possible implementation manner of the second aspect of the present invention, in a ninth possible implementation manner, after the receiving, by the UE in the 2G/3G network, a notification message sent by an MSC/VLR, the method further includes:

saving, by the UE, the EPLMN list in the notification message.

With reference to the ninth possible implementation manner of the second aspect of the present invention, in a tenth possible implementation manner, the saving, by the UE, the EPLMN list in the notification message includes:

if the UE already stores an old EPLMN list, replacing, by the UE, the old EPLMN list with the EPLMN list in the notification message.

With reference to the tenth possible implementation manner of the second aspect of the present invention, in an eleventh possible implementation manner, the saving, by the UE, the EPLMN list further includes:

adding, by the UE, the identity of the LTE PLMN in the notification message to the EPLMN list.

With reference to the second aspect of the present invention or any one of the first to eleventh possible implementation manners of the second aspect, in a twelfth possible implementation manner, the selecting, by the UE, the LTE PLMN according to the identity of the LTE PLMN in the notification message includes:

selecting, by the UE, a suitable cell in an LTE frequency band according to the identity of the LTE PLMN, and camping on the selected suitable cell.

With reference to the second aspect of the present invention or any one of the first to eleventh possible implementation manners of the second aspect, in a thirteenth possible implementation manner, the selecting, by the UE, the LTE PLMN according to the identity of the LTE PLMN in the notification message includes:

selecting, by the UE, a suitable cell in an LTE frequency band according to the identity of the LTE PLMN and the EPLMN list, and camping on the selected suitable cell.

A third aspect of the present invention provides a mobile switching center/visitor location register MSC/VLR, including:

a memory, configured to store an identity of an LTE public land mobile network PLMN in which user equipment UE is registered;

a processor, configured to: when generating a notification message, include the identity, which is stored in the memory, of the LTE PLMN in which the UE is registered in the notification message, and send the notification message to a transmitter; and the transmitter, configured to receive the notification message sent by the processor, and send the notification message to the UE, where the notification message includes the identity of the LTE PLMN in which the UE is registered, and the MSC/VLR is a first MSC/VLR after the UE initiates a circuit switched fallback CSFB service in the LTE PLMN and falls back to a 2nd Generation/3rd Generation 2G/3G network, where the notification message is used to instruct the UE to select the LTE PLMN according to the identity of the LTE PLMN in the notification message after the CSFB service ends.

With reference to the third aspect of the present invention, in a first possible implementation manner, the notification message generated by the processor includes a first notification message that includes a location area identity LAI, where the LAI includes the identity of the LTE PLMN in which the UE is registered, and the LAI is used to instruct the UE to select the LTE PLMN according to the identity of the LTE PLMN in the LAI after the CSFB service ends.

With reference to the third aspect of the present invention, in a second possible implementation manner, the notification message generated by the processor includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to either of the foregoing possible implementation manners of the third aspect of the present invention, in a third possible implementation manner, the notification message sent by the transmitter includes a mobility management message.

With reference to the third possible implementation manner of the third aspect of the present invention, in a fourth possible implementation manner, the mobility management message sent by the transmitter includes a temporary mobile subscriber identity TMSI reallocation message, a location update accept message, or a mobility management information message.

With reference to any one of the foregoing possible implementation manners of the third aspect of the present invention, in a fifth possible implementation manner, the transmitter sends the notification message to the UE in any one of the following cases:

after a CS signaling connection is established; or
in a process in which a CS service is performed; or
after a CS service ends and before a CS signaling connection is released.

With reference to the fifth possible implementation manner of the third aspect of the present invention, in a sixth possible implementation manner, the MSC/VLR further includes a receiver, where if the receiver receives, in a fallback process of the CSFB service, a location update process initiated by the UE, the transmitter sends the notification message to the UE after the location update process is completed.

With reference to any one of the foregoing possible implementation manners of the present invention, in a seventh possible implementation manner, the notification message generated by the processor further includes an equivalent public land mobile network EPLMN list, and a PLMN in the EPLMN list is a PLMN equivalent to the LTE PLMN in the notification message.

A fourth aspect of the present invention provides user equipment UE, including:

a transmitter, configured to initiate a circuit switched fallback CSFB service in an LTE public land mobile network PLMN in which the UE is registered and fall back to a 2nd Generation/3rd Generation 2G/3G network;

a receiver, configured to receive, in the 2G/3G network, a notification message sent by an MSC/VLR, where the notification message includes an identity of the LTE PLMN in which the UE is registered; and a processor, configured to: after the circuit switched fallback CSFB service ends, select the LTE PLMN according to the identity of the LTE PLMN in the notification message.

With reference to the fourth aspect of the present invention, in a first possible implementation manner, the notification message received by the receiver includes a first notification message that includes a location area identity LAI, where the LAI includes the identity of the LTE PLMN in which the UE is registered.

With reference to the first possible implementation manner of the fourth aspect of the present invention, in a second possible implementation manner, the UE further includes:

a memory, configured to: after the receiver receives, in the 2G/3G network, the notification message sent by the MSC/VLR, save the LAI in the notification message, and use an LTE PLMN in the LAI as a registered PLMN.

With reference to the second possible implementation manner of the fourth aspect of the present invention, in a third possible implementation manner, the memory is further configured to:

if an old LAI is already stored, replace the old LAI with the LAI in the notification message.

With reference to the first possible implementation manner of the fourth aspect of the present invention, in a fourth possible implementation manner, the notification message received by the receiver includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to the fourth possible implementation manner of the fourth aspect of the present invention, in a fifth possible implementation manner, the UE further includes:

a memory, configured to: after the receiver receives, in the 2G/3G network, the notification message sent by the MSC/VLR, save the identity of the LTE PLMN in the notification message, and use the LTE PLMN in the notification message as a registered PLMN according to the indication information.

With reference to the fifth possible implementation manner of the fourth aspect of the present invention, in a sixth possible implementation manner, the memory is further configured to:

if an identity of an old LTE PLMN is already stored, replace the identity of the old LTE PLMN with the identity of the LTE PLMN in the notification message.

With reference to any one of the foregoing possible implementation manners of the fourth aspect of the present invention, in a seventh possible implementation manner, the notification message received by the receiver includes a mobility management message.

With reference to the seventh possible implementation manner of the fourth aspect of the present invention, in an eighth possible implementation manner, the mobility management message includes a temporary mobile subscriber identity TMSI reallocation message, a location update accept message, or a mobility management information message.

With reference to any one of the foregoing possible implementation manners of the fourth aspect of the present invention, in a ninth possible implementation manner, the notification message received by the receiver further includes an equivalent public land mobile network EPLMN list, and a PLMN in the EPLMN list is a PLMN equivalent to the LTE PLMN in the notification message.

With reference to the ninth possible implementation manner of the fourth aspect of the present invention, in a tenth possible implementation manner, the memory is further configured to:

after the receiver receives, in the 2G/3G network, the notification message sent by the MSC/VLR, save the EPLMN list in the notification message.

With reference to the tenth possible implementation manner of the fourth aspect of the present invention, in an eleventh possible implementation manner, the memory is further configured to: if the memory already stores an old EPLMN list, replace the old EPLMN list with the EPLMN list in the notification message.

With reference to the eleventh possible implementation manner of the fourth aspect of the present invention, in a twelfth possible implementation manner, the processor is further configured to add the identity of the LTE PLMN in the notification message to the EPLMN list.

With reference to the fourth aspect of the present invention or any one of the first to twelfth possible implementation manners of the fourth aspect, in a thirteenth possible implementation manner, the processor is further configured to select a suitable cell in an LTE frequency band according to the identity of the LTE PLMN, and camp on the selected suitable cell.

With reference to the fourth aspect of the present invention or any one of the first to thirteenth possible implementation manners of the fourth aspect, in a fourteenth possible implementation manner, the processor is further configured to select a suitable cell in an LTE frequency band according to the identity of the LTE PLMN and the EPLMN list, and camp on the selected suitable cell.

A fifth aspect of the present invention provides a mobile switching center/visitor location register MSC/VLR, including:

a sending unit, configured to send a notification message to user equipment UE, where the notification message includes an identity of an LTE public land mobile network PLMN in which the UE is registered, and the MSC/VLR is a first MSC/VLR after the UE initiates a circuit switched fallback CSFB service in the LTE PLMN and falls back to a 2nd Generation/3rd Generation 2G/3G network; and the notification message is used to instruct the UE to select the LTE PLMN according to the identity of the LTE PLMN in the notification message after the CSFB service ends.

With reference to the fifth aspect of the present invention, in a first possible implementation manner, the notification message sent by the sending unit includes a first notification message that includes a location area identity LAI, where the LAI includes the identity of the LTE PLMN in which the UE is registered, and the LAI is used to instruct the UE to select the LTE PLMN according to the identity of the LTE PLMN in the LAI after the CSFB service ends.

With reference to the fifth aspect of the present invention, in a second possible implementation manner, the notification message sent by the sending unit includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to either of the foregoing possible implementation manners of the fifth aspect of the present invention, in a third possible implementation manner, the notification message sent by the sending unit includes a mobility management message.

With reference to the third possible implementation manner of the fifth aspect of the present invention, in a fourth possible implementation manner, the mobility management message sent by the sending unit includes a temporary mobile subscriber identity TMSI reallocation message, a location update accept message, or a mobility management information message.

With reference to the fourth possible implementation manner of the fifth aspect of the present invention, in a fifth possible implementation manner, the sending unit sends the notification message to the UE in any one of the following cases:

after a CS signaling connection is established; or in a process in which a CS service is performed; or after a CS service ends and before a CS signaling connection is released.

With reference to the fifth possible implementation manner of the fifth aspect of the present invention, in a sixth possible implementation manner, the MSC/VLR further includes a receiving unit, and if the receiving unit receives, in a fallback process of the CSFB service, a location update process initiated by the UE, the sending unit sends the notification message to the UE after the location update process is completed.

With reference to any one of the foregoing possible implementation manners of the fifth aspect of the present invention, in a seventh possible implementation manner, the notification message sent by the sending unit further includes an equivalent public land mobile network EPLMN list, and a PLMN in the EPLMN list is a PLMN equivalent to the LTE PLMN in the notification message.

A sixth aspect of the present invention provides user equipment UE, including:

a sending unit, initiating a circuit switched fallback CSFB service in an LTE public land mobile network PLMN in which the UE is registered and falling back to a 2nd Generation/3rd Generation 2G/3G network;

a receiving unit, configured to receive, in the 2G/3G network, a notification message sent by an MSC/VLR, where the notification message includes an identity of the LTE PLMN in which the UE is registered; and a selection unit, configured to: after the circuit switched fallback CSFB service ends, select the LTE PLMN according to the identity of the LTE PLMN in the notification message received by the receiving unit.

With reference to the sixth aspect of the present invention, in a first possible implementation manner, the notification message received by the receiving unit includes a first notification message that includes a location area identity LAI, where the LAI includes the identity of the LTE PLMN in which the UE is registered.

With reference to the first possible implementation manner of the sixth aspect of the present invention, in a second possible implementation manner, the UE further includes:

a saving unit, configured to: after the receiving unit receives, in the 2G/3G network, the notification message sent by the MSC/VLR, save the LAI in the notification message, and use an LTE PLMN in the LAI as a registered PLMN.

With reference to the second possible implementation manner of the sixth aspect of the present invention, in a third possible implementation manner, the saving unit is further configured to:

if an old LAI is already stored, replace the old LAI with the LAI in the notification message.

With reference to the third possible implementation manner of the sixth aspect of the present invention, in a fourth possible implementation manner, the notification message received by the receiving unit includes a second notification message that includes the identity of the LTE PLMN in which the UE is registered and indication information, where the indication information is used to instruct the UE to select the LTE PLMN according to the identity of the LTE PLMN in the second notification message after the CSFB service ends.

With reference to the fourth possible implementation manner of the sixth aspect of the present invention, in a fifth possible implementation manner, the UE further includes:

a saving unit, configured to: after the receiving unit receives, in the 2G/3G network, the notification message sent by the MSC/VLR, save the identity of the LTE PLMN in the notification message, and use the LTE PLMN in the notification message as a registered PLMN according to the indication information.

With reference to the fifth possible implementation manner of the sixth aspect of the present invention, in a sixth possible implementation manner, the saving unit is further configured to:

if an identity of an old LTE PLMN is already stored, replace the identity of the old LTE PLMN with the identity of the LTE PLMN in the notification message.

With reference to the sixth aspect of the present invention or any one of the foregoing possible implementation manners of the sixth aspect, in a seventh possible implementation manner, the notification message received by the receiving unit includes a mobility management message.

With reference to the seventh possible implementation manner of the sixth aspect of the present invention, in an eighth possible implementation manner, the mobility management message received by the receiving unit includes a temporary mobile subscriber identity TMSI reallocation message, a location update accept message, or a mobility management information message.

With reference to any one of the foregoing possible implementation manners of the sixth aspect of the present invention, in a ninth possible implementation manner, the notification message received by the receiving unit further includes an equivalent public land mobile network EPLMN list, and a PLMN in the EPLMN list is a PLMN equivalent to the LTE PLMN in the notification message.

With reference to the ninth possible implementation manner of the sixth aspect of the present invention, in a tenth possible implementation manner, the saving unit is further configured to:

after the receiving unit receives, in the 2G/3G network, the notification message sent by the MSC/VLR, save the EPLMN list in the notification message.

With reference to the tenth possible implementation manner of the sixth aspect of the present invention, in an eleventh possible implementation manner, the saving unit is further configured to:

if an old EPLMN list is already stored, replace the old EPLMN list with the EPLMN list in the notification message.

With reference to the eleventh possible implementation manner of the sixth aspect of the present invention, in a twelfth possible implementation manner, the saving unit is further configured to:

add the identity of the LTE PLMN in the notification message to the EPLMN list.

With reference to the sixth aspect of the present invention or any one of the first to twelfth possible implementation manners of the sixth aspect, in a thirteenth possible implementation manner, the selection unit is further configured to:

select a suitable cell in an LTE frequency band according to the identity of the LTE PLMN, and camp on the selected suitable cell.

With reference to the sixth aspect of the present invention or any one of the first to twelfth possible implementation manners of the sixth aspect, in a fourteenth possible implementation manner, the selection unit is further configured to:

select a suitable cell in an LTE frequency band according to the identity of the LTE PLMN and the EPLMN list, and camp on the selected suitable cell.

According to the method for selecting an LTE network and the device provided in the embodiments of the present invention, an MSC/VLR sends, to UE, a notification message that includes an identity of an LTE PLMN in which the UE is registered, so that after a CSFB service ends, the UE selects the LTE PLMN corresponding to the identity of the LTE PLMN included in the notification message. Compared with the prior art in which UE is made to randomly return to an LTE network of any adjacent LTE PLMN, in the present invention, it may be specified that the UE returns to an LTE PLMN in which the UE is registered when CSFB is initiated, which not only reduces unnecessary inter-PLMN handover but also restores a data service suspended in an LTE PLMN in which the UE is registered before, thereby improving user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
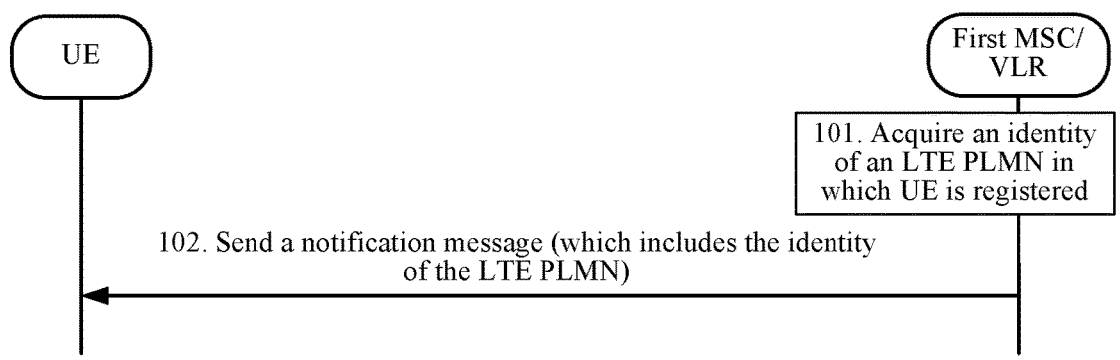
FIG. 1 is a flowchart of a method for selecting an LTE network according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In this specification, an LTE network is an evolved UMTS (Universal Mobile Telecommunications System) terrestrial radio access network (E-UTRAN for short), a 2nd Generation (2G) network is a GSM (Global System for Mobile communications)/EDGE (Enhanced Data Rate for GSM Evolution) radio access network (GERAN for short), and a 3rd Generation (3G) network is a UTRAN network. A PLMN in the LTE network provides only a PS domain service, while the 2G/3G network not only includes a PLMN providing a CS domain service but also includes a PLMN providing a PS domain service.

In the embodiments of the present invention, user equipment UE may be any one of the following, and the user equipment may be static or mobile. User equipment may include, but is not limited to a station, a mobile station, a subscriber unit, a personal computer, a laptop computer, a tablet computer, a netbook, a terminal, a cellular phone, a handheld device, a cordless telephone set, a personal digital assistant (PDA), a data card, a USB plug-in device, a mobile WiFi hotspot device (MiFi Devices), a smart watch, smart glasses, a wireless modem, a wireless router, and a wireless local loop (WLL) station. The foregoing user equipment may be distributed in an entire wireless network.

To facilitate understanding of a person skilled in the art, the following makes a description by using a specific application example. It should be noted that, in the embodiments of the present invention, an LTE base station may be a base station providing an LTE network access service, for example, an eNodeB. A 2nd Generation/3rd Generation 2G/3G base station may be a base station subsystem (BSS) in a 2G network, or a radio network subsystem (RNS) in a 3G network. A mobility management network element may be any one of a mobile switching center (MSC)/visitor location register (VLR), a mobility management entity (MME), and a serving GPRS support node (SGSN), where the MSC and the VLR are generally provided as a same network element, which is referred to as an MSC/VLR or is briefly referred to as a VLR.

Because an LTE network supports only a PS data service, when UE performs a data service or is in an idle state in the LTE network, if the UE initiates or receives a circuit switched CS service (which includes a voice call, a supplementary service, a location service, and the like), a circuit switched fallback (CSFB) process needs to be performed, to enable the UE to fall back to the 2G/3G network from the LTE, so that the UE completes the CS service in the 2G/3G network. After the CS service ends (for example, after an underlying link of the UE established for the CS service in the 2G/3G network is released), a terminal needs to return to the LTE network, so as to continue the data service in the LTE network. Because after the CS service is completed, the UE may be in the coverage of LTE networks of multiple different PLMNs, for example, an LTE PLMN in which the UE is registered when a CSFB is initiated and an LTE network of a PLMN in which the 2G/3G network is located after a current fallback are both available to the UE. Typically, if the UE enters a shared LTE cell after completing the CS service, the UE may acquire multiple available LTE PLMNs in the LTE cell. In a scenario in which multiple LTE PLMNs are available, it cannot be ensured in the prior art that the UE selects an LTE PLMN in which the UE is located before the CSFB is initiated, that is, it cannot be ensured that the UE returns to an LTE PLMN in which the UE is located before the CSFB is initiated. If the UE cannot return to the LTE PLMN in which the UE is located before the CSFB is initiated, a data service, which is suspended before due to initiation of the CSFB, in the LTE PLMN in which the UE is located cannot be restored, and consequently, an on-going data service is terminated, and unnecessary inter-PLMN handover is caused, which affects user experience.

In the embodiments of the present invention, the CS service includes an uplink CS service and a downlink CS service. For example, the UE receives a voice call paging, an active voice call, or the like in the LTE network. In the embodiments of the present invention, a first MSC/VLR is an MSC/VLR that provides a service for a CS service after the UE initiates a CSFB process and falls back to a 2G/3G network, and a second MSC/VLR is a first MSC/VLR when the UE camps on the LTE network after the UE successfully performs joint registration in the LTE network.

The interior of the UE may be divided into an access stratum (AS) and a non-access stratum (NAS) according to different processed and controlled message objects. The AS is responsible for receiving an RR/RRC connection release message, selecting and camping on a suitable cell according to a frequency band, reading a cell system broadcast message, acquiring available PLMN information, and then reporting the available PLMN information to the NAS. The NAS determines, according to the available PLMN information reported by an AS layer, whether to perform PLMN selection.

An embodiment of the present invention provides a method for selecting an LTE network. As shown in FIG. 1, the method includes:

101: A first MSC/VLR acquires an identity of an LTE PLMN in which UE is registered, where the first MSC/VLR is an MSC/VLR that provides, after the UE falls back to a 2nd Generation/3rd Generation 2G/3G network from the LTE PLMN because of performing a CS service, a service for the CS service.

102: The first MSC/VLR sends a notification message to the UE, where the notification message includes the identity of the LTE PLMN, and the notification message is used to instruct the UE to select, according to the identity of the LTE PLMN, the LTE PLMN that the UE is to return to, where the LTE PLMN is used as a registered PLMN in the 2G/3G network.

The notification message is used to instruct the UE to select the LTE PLMN according to the identity of the LTE PLMN in the notification message after the CSFB service ends. The UE may uniquely determine the corresponding LTE PLMN by using the identity of the LTE PLMN and select the LTE PLMN to provide an LTE service for the UE.

In this embodiment, according to different message content, the notification message may include a first notification message or a second notification message. The first notification message includes a location area identity (LAI), where the LAI includes an identity of an LTE PLMN in which the UE is registered before the CSFB is initiated, and the LAI is used to instruct the UE to select the LTE PLMN according to the identity of the LTE PLMN in the LAI after the CSFB service ends. The second notification message includes the identity of the LTE PLMN in which the UE is registered and indication information, where the indication information is used to instruct the UE select the LTE PLMN according to the identity of the LTE PLMN in the second notification message after the CSFB service ends. According to different message forms, the notification message may include a mobility management message. The mobility management message may be also referred to as a non-access stratum (NAS) message or a layer 3 (Layer 3) message, for example, a temporary mobile subscriber identity (TMSI) reallocation message, a location update accept message, or a mobility management information message.

If the first MSC/VLR is a registered MSC/VLR of the UE, the first MSC/VLR acquires, from registration information of the UE, an identity of the UE and information about the identity of the LTE PLMN in which the UE is registered. If the first MSC/VLR is not a registered MSC/VLR of the UE, the first MSC/VLR acquires, from a registered MSC/VLR of the UE, an identity of the UE and information about the identity of the LTE PLMN in which the UE is registered, so as to perform step 101 of sending the identity of the LTE PLMN in which the UE is registered to the UE.

The identity of the UE may be a system architecture evolution (SAE) temporary mobile subscriber identity (S-TMSI), an international mobile subscriber identity (IMSI), or a temporary mobile subscriber identity (TMSI), which is not limited in this embodiment of the present invention. The information about the identity of the LTE PLMN in which the UE is registered may be a registered LTE PLMN identity (ID), a globally unique temporary identity (GUTI) including a registered LTE PLMN ID, a tracking area identity (TAI) including a registered LTE PLMN ID, or an E-UTRAN cell global identity (ECGI) including a registered LTE PLMN ID, which is not limited in this embodiment of the present invention.

According to the method for selecting an LTE network provided in this embodiment of the present invention, an MSC/VLR sends, to UE, a notification message including an identity of an LTE PLMN in which the UE is registered, so that after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 2:
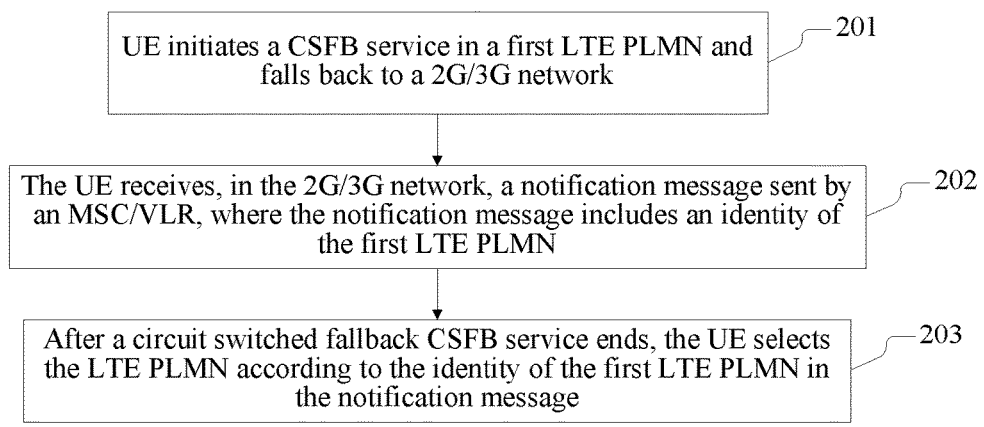
FIG. 2 is a flowchart of a method for selecting an LTE network according to another embodiment of the present invention.

Another embodiment of the present invention provides a method for selecting a Long Term Evolution LTE network. As shown in FIG. 2, the method includes:

201: UE initiates a CSFB service in a first LTE PLMN and falls back to a 2G/3G network.

202: The UE receives, in the 2G/3G network, a notification message sent by a first MSC/VLR, where the notification message includes an identity of the first LTE PLMN.

203: After a circuit switched fallback CSFB service ends, the UE selects the LTE PLMN according to the identity of the first LTE PLMN in the notification message.

According to the method for selecting an LTE network provided in this embodiment of the present invention, UE receives a notification message sent by an MSC/VLR and including an identity of an LTE PLMN in which the UE is registered, and after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 3:
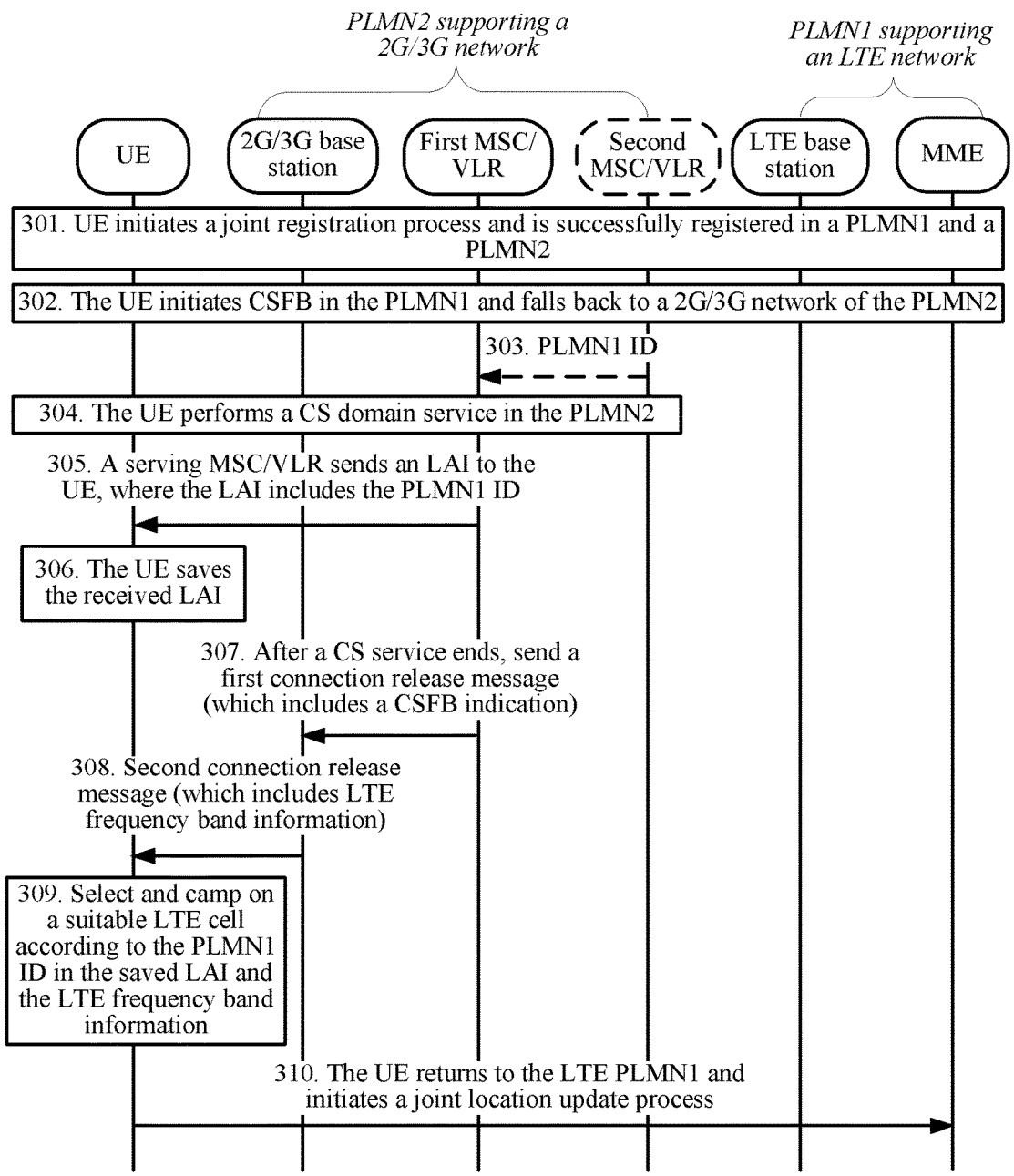
FIG. 3 is a flowchart of a method for selecting an LTE network according to another embodiment of the present invention.

Another embodiment of the present invention provides a method for selecting an LTE network. As shown in FIG. 3, the method includes:

301: UE initiates joint registration and is successfully registered in a PLMN1 supporting an LTE network and a PLMN2 supporting a 2G/3G network.

UE camping on an E-UTRAN and supporting CSFB needs to initiate a joint registration process to implement simultaneous registration in a PS domain of the PLMN1 and a CS domain of the PLMN2. When the UE is registered in the PS domain of the PLMN1, a second MSC/VLR in the PLMN2 may acquire an identifier of the UE and a PLMN ID1 of the PLMN1. It should be noted that, the joint registration process may be a joint attach process or a joint location update process. The joint location update process may be specifically a joint tracking area updating (TAU) process.

In the joint registration process, a network side selects a second MSC/VLR for the UE: A mobile management entity (MME) selects a second MSC/VLR that may provide a service for the UE and sends a location update request to the selected second MSC/VLR, so as to establish an SGs association. The second MSC/VLR sends a registration request to a home location register (HLR) and acquires CS domain subscription data of the UE, to implement registration of the UE in the CS domain. Optionally, in a scenario in which an MSC resource pool (MSC pool) is not deployed, the MME selects, according to information about a current location of the UE, a second MSC/VLR that may provide a service for the UE; or in a scenario in which an MSC resource pool (MSC pool) is deployed, the MME selects a second MSC/VLR from an MSC pool according to information about a current location of the UE and an international mobile subscriber identity (IMSI) hash table.

302: The UE initiates CSFB in the PLMN1 and falls back to the 2G/3G network of the PLMN2.

CSFB can be normally initiated only after joint registration is successfully implemented. In a process in which the UE initiates an uplink and downlink CSFB process, an MME in the PLMN1 sends an identity ID of the PLMN2 to an LTE base station (eNodeB) in the LTE network, so as to notify the LTE base station (eNodeB) that the LTE base station should enable the UE to fall back to the 2G/3G network in the PLMN2. After handed over to the 2G/3G network of the PLMN2, the UE may initiate a CS service. For example, in an initiated CS voice call establishment process, the UE may send a CSFB indication to the first MSC/VLR, where the CSFB indication is used to indicate that this voice call is triggered by performing of CSFB in the LTE network. After a CS voice call connection is successfully established, the UE makes a voice call.

Optionally, if the UE falls back to a new location area (LA) of the 2G/3G network of the PLMN2, that is, an LA after fallback is different from an LA in which the UE is located when the joint registration succeeds in step 301, the UE initiates a location area update (LAU) process of the CS domain to the first MSC/VLR. In the process, the first MSC/VLR may send a location area identity (lAI) of the UE in the 2G/3G network to the UE. The LAI includes an ID of the PLMN2 in which the first MSC/VLR is located.

303: A second MSC/VLR sends, to a first MSC/VLR, a PLMN1 ID of the LTE network in which the UE is registered.

Step 303 is an optional step. If the first MSC/VLR after the UE falls back to the 2G/3G network is the second MSC/VLR, step 303 is not performed. Step 303 is performed only when the first MSC/VLR of the UE is not the second MSC/VLR in which the UE is registered in step 301.

In the joint registration process in step 301, the second MSC/VLR may acquire, from registration information, the PLMN1 ID of the LTE network in which the UE is registered. For example, in the joint registration process, the MME sends an MME name of the MME to the second MSC/VLR. The MME name includes the PLMN1 ID of the LTE network in which the UE is registered. Alternatively, in the joint registration process, the MME may send a tracking area identity (Tracking Area Identity, TAI) or an E-UTRAN cell global identity (E-UTRAN Cell Global Identity, ECGI) to the second MSC/VLR. Both the TAI and the ECGI include the PLMN1 ID of the LTE network in which the UE is registered.

In this embodiment, if the UE enters another MSC/VLR after falling back to the 2G/3G network, that is, within a service range of the first MSC/VLR, the UE reports location information of the second MSC/VLR to the first MSC/VLR when initiating a location update process to the first MSC/VLR. Then, the first MSC/VLR selects the second MSC/VLR according to the location information reported by the UE, and sends a request to the second MSC/VLR to acquire the PLMN1 ID of the LTE network in which the UE is registered, and the second MSC/VLR sends, to the first MSC/VLR, the PLMN1 ID, which is acquired in step 301, of the LTE network in which the UE is registered.

304: The UE performs a CS domain service in the PLMN2.

The CS domain service performed after CSFB may include: initiating or receiving a voice call, a supplementary service, a location service, or the like.

305: The first MSC/VLR sends an LAI to the UE, where the LAI includes the PLMN1 ID of the LTE network in which the UE is registered.

The first MSC/VLR sends a layer 3 (Layer 3) message to the UE, where the message includes the LAI. The layer 3 message may be a temporary mobile subscriber identity (TMSI) reallocation message or a mobility management information message.

Further, the first MSC/VLR may send the LAI to the UE in any one of the following cases:

(1) after a CS signaling connection is established, that is, the UE is in a CS connection state; or (2) in a process in which a CS service is performed; or (3) after a CS service ends and before a CS signaling connection is released.

It should be noted that, if the UE initiates an LAU process to the first MSC/VLR in step 302, the first MSC/VLR can send the LAI to the UE only after the LAU process is completed. In this case, sending may be still performed according to the foregoing three possible cases.

Optionally, in this step, the first MSC/VLR may send an equivalent PLMN (EPLMN) list to the UE, and a PLMN in the EPLMN list is a PLMN equivalent to the PLMN1 ID of the LTE network in the LAI.

306: The UE saves the received LAI.

After receiving the layer 3 message, for example, the TMSI reallocation message, the UE saves a received LAI, and if the UE already stores an LAI before, the UE replaces the LAI saved before with the newly-received LAI. The UE uses the PLMN1 in the LAI as a PLMN in which the UE is currently registered, so as to select a suitable cell in subsequent step 309. It should be noted that, that the UE uses a PLMN in the saved LAI as a PLMN in which the UE is currently registered is the prior art.

Optionally, if the UE receives an EPLMN list in step 305, the UE saves the list, and if the UE already stores an EPLMN list before, the UE replaces the EPLMN list saved before with the newly-received EPLMN list. Further, the UE may add the PLMN1 ID, in the LAI, of the LTE network in which the UE is registered to the EPLMN list. It should be noted that, if the UE does not receive the EPLMN list in step 305 but the UE already stores an EPLMN list before, the UE may also add the PLMN1 ID, in the LAI, of the LTE network in which the UE is registered to the EPLMN list saved before.

307: When a CS service of the UE ends, the first MSC/VLR sends a first connection release message to a 2G/3G base station, where the first connection release message includes a CSFB indication, that is, the 2G/3G base station learns that a CSFB service of the UE ends.

After the CS domain service of the UE ends, the first MSC/VLR initiates a connection release process to the base station, and adds a CSFB indication to the first connection release message. The CSFB indication is used to indicate that the CS domain service of the current UE is caused by CSFB, and after the CS domain service ends, the UE needs to be redirected and return to the LTE network.

308: The 2G/3G base station sends a second connection release message including LTE frequency band information to the UE.

After receiving the first connection release message, the 2G/3G base station selects LTE frequency band information for the UE according to the CSFB indication, where the determined LTE frequency band information may be LTE frequency band information supported by the LTE PLMN1 in which the UE is registered, LTE frequency band information corresponding to the PLMN2, or LTE frequency band information supported by another PLMN, which is not limited in this embodiment of the present invention.

Further, the 2G/3G base station may send the selected LTE frequency band information to the UE in any one of the following implementation manners:

In an optional implementation manner, the 2G/3G base station may directly include the selected LTE frequency band information in the second connection release message. Specifically, if the 2G/3G base station is a base station subsystem BSS in a 2G network, the selected LTE frequency band information is included in a channel release message and sent to the UE. If the 2G/3G base station is a radio network subsystem RNS in a 3G network, the selected LTE frequency band information is included in an RRC connection release message and sent to the UE. After receiving the second connection release message or the channel release message, the UE enters an idle state.

In another optional implementation manner, the 2G/3G base station may include the selected LTE frequency band information in redirection information and then include the redirection information in the second connection release message. Specifically, if the 2G/3G base station is a base station subsystem BSS in a 2G network, the 2G/3G base station includes the redirection information in a channel release message and sends the channel release message to the UE. If the 2G/3G base station is a radio network subsystem RNS in a 3G network, the 2G/3G base station includes the redirection information in an RRC connection release message and sends the RRC connection release message to the UE. After receiving the second connection release message or the channel release message, the UE enters an idle state.

In still another optional implementation manner, the 2G/3G base station may include the selected LTE frequency band information in priority information and then include the priority information in the second connection release message. Specifically, if the 2G/3G base station is a base station subsystem BSS in a 2G network, the 2G/3G base station includes the priority information in a channel release message and sends the channel release message to the UE. If the 2G/3G base station is a radio network subsystem RNS in a 3G network, the 2G/3G base station includes the priority information in a mobility information message and sends the mobility information message to the UE.

The first connection release message and the second connection release message mentioned in the specification of this application may be a radio resource (RR) connection release message, a radio resource control (RRC) connection release message, or another message used to help releasing a radio resource. If the 2G/3G base station is a BSS, the BSS sends an RR connection release message to the UE and includes redirection information or priority information in the RR connection release message, to instruct the UE to perform redirection and fall back to the LTE network after an RR connection is released. If the base station is an RNS, the RNS sends an RRC connection release message to the UE and includes redirection information in the message; or sends a mobility information message to the UE and includes priority information in the message, to instruct the UE to perform redirection and fall back to the LTE network after an RRC connection is released.

309: The UE selects and camps on a suitable cell according to the PLMN1 ID in the LAI and the LTE frequency band information.

After releasing the current RR/RRC connection, the UE reselects a cell or selects a cell according to the LTE frequency band information delivered by the 2G/3G base station, that is, selects a cell in an LTE frequency band corresponding to the LTE frequency band information, selects a suitable cell according to the PLMN1 ID, in the saved LAI, of the LTE network in which the UE is registered, and camps on the selected suitable cell. Optionally, if the UE already stores an EPLMN list, the UE may select a suitable cell according to the PLMN1 ID, in the saved LAI, of the LTE network in which the UE is registered and the EPLMN list.

The suitable cell is a cell on which UE can camp and can acquire a normal service. In actual application, it may occur that UE cannot acquire a normal service (for example, can only acquire an emergency service) in a cell found in an LTE frequency band, that is, the found cell is a non-suitable cell. In this case, the UE may search for a suitable cell again in all frequency bands. However, this case is beyond consideration of this embodiment of the present invention and therefore is not described in detail.

310: The UE returns to the LTE network PLMN1 in which the UE is registered and initiates a joint location update process.

After selecting and camping on the suitable cell in the LTE network PLMN1, that is, the UE returns to the LTE network PLMN1 in which the UE is registered, to implement registration of the UE in the LTE network PLMN1, the UE initiates a joint location update process. Specifically, the joint location update process may be a joint TAU process.

According to the method for selecting an LTE network provided in this embodiment of the present invention, after UE initiates a CSFB process and falls back to a CS domain of a 2G/3G network, a first MSC/VLR includes a PLMN ID of an LTE network in which the UE is registered in an LAI and sends the LAI to the UE, and when the UE reselects an LTE cell or selects a cell after a CSFB service ends and according to LTE frequency band information delivered by a 2G/3G base station, the UE selects and camps on a suitable cell according to the PLMN of the LTE network in the LAI, so as to ensure that the UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 4:
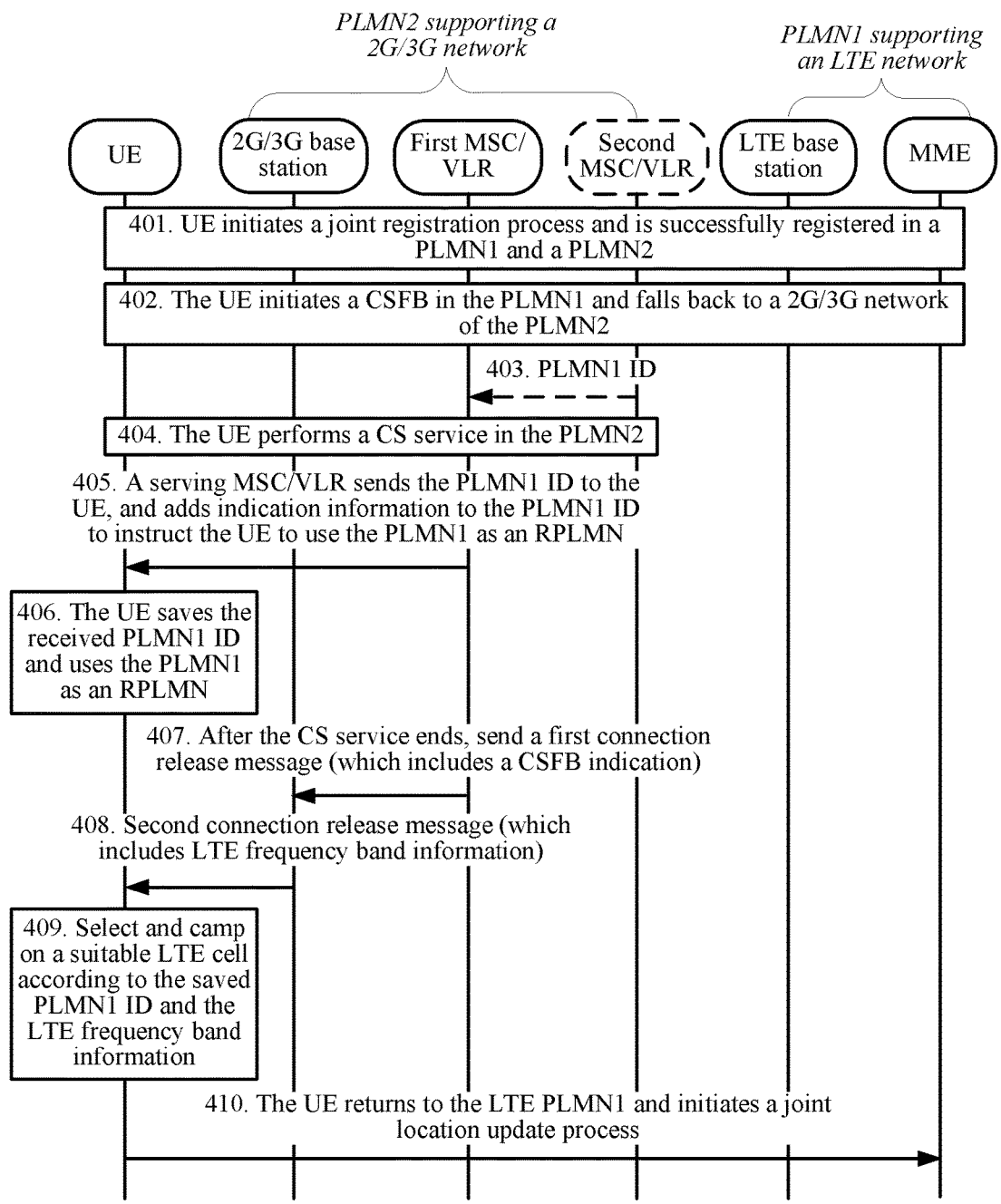
FIG. 4 is a flowchart of a method for selecting an LTE network according to another embodiment of the present invention.

Another embodiment of the present invention provides a method for selecting an LTE network. As shown in FIG. 4, the method includes:

401 to 404 are the same as steps 301 to 304 in the embodiment shown in FIG. 3.

405: The first MSC/VLR sends the PLMN1 ID of the LTE network in which the UE is registered to the UE, and adds indication information to the PLMN1 ID to instruct the UE to use the PLMN1 as a registered PLMN (RPLMN).

The first MSC/VLR sends a layer 3 (Layer 3) message to the UE, and the message includes the PLMN1 ID of the LTE network in which the UE is registered. The layer 3 message may be a mobility management (MM) information (Information) message or a TMSI reallocation message, and may also be another mobility management message.

Further, the first MSC/VLR may send the PLMN1 ID of the LTE network in which the UE is registered to the UE in any one of the following cases:

(1) after a CS signaling connection is established, that is, the UE is in a CS connection state; or (2) in a process in which a CS service is performed; or (3) after a CS service ends and before a CS signaling connection is released.

Optionally, in this step, the first MSC/VLR may send an equivalent PLMN (EPLMN) list to the UE, and a PLMN in the EPLMN list is a PLMN equivalent to the PLMN1 ID of the LTE network in which the UE is registered.

406: The UE saves the received PLMN1 ID and uses the PLMN1 as an RPLMN according to the indication information.

After receiving the layer 3 message, the UE saves the received PLMN1 ID, and uses the PLMN1 as an RPLMN according to the indication information, so as to select a suitable cell in subsequent step 409. If the UE already stores an LAI before, optionally, the UE may replace an PLMN ID in the LAI saved before with the PLMN1 ID according to the indication information, that is, the LAI saved before is updated with the PLMN1 ID. By performing the action, the UE may also use a PLMN1 in an LAI obtained after updating as a current RPLMN. It should be noted that, that the UE uses a PLMN in the saved LAI as a current RPLMN is the prior art.

Optionally, if the UE receives an EPLMN list in step 405, the UE saves the EPLMN list, and if the UE already stores an EPLMN list before, the UE replaces the EPLMN list saved before with the newly-received EPLMN list. Further, the UE may add the received PLMN1 ID to the EPLMN list. It should be noted that, if the UE does not receive the EPLMN list in step 405 but the UE already stores an EPLMN list before, the UE may also add the received PLMN1 ID to the EPLMN list saved before.

407: When a CS domain service of the UE ends, the first MSC/VLR sends a first connection release message to a 2G/3G base station, where the first connection release message includes a CSFB indication, that is, the 2G/3G base station learns that a CSFB service of the UE ends.

After the CS domain service of the UE ends, the first MSC/VLR initiates a connection release process to the base station, adds a CSFB indication to the first connection release message carries. The CSFB indication is used to indicate that the CS domain service of the current UE is caused by CSFB, and after the CS domain service ends, the UE needs to be redirected and return to the LTE network.

408: The 2G/3G base station sends a second connection release message including LTE frequency band information to the UE.

After receiving the first connection release message, the 2G/3G base station selects LTE frequency band information for the UE according to the CSFB indication, where the determined LTE frequency band information may be LTE frequency band information supported by the LTE PLMN1 in which the UE is registered, LTE frequency band information corresponding to the PLMN2, or LTE frequency band information supported by another PLMN, which is not limited in this embodiment of the present invention.

Further, the 2G/3G base station may send the selected LTE frequency band information to the UE in any one of the following implementation manners:

In an optional implementation manner, the 2G/3G base station may directly include the selected LTE frequency band information in the second connection release message. Specifically, if the 2G/3G base station is a base station subsystem BSS in a 2G network, the selected LTE frequency band information is included in a channel release message and sent to the UE. If the 2G/3G base station is a radio network subsystem RNS in a 3G network, the selected LTE frequency band information is included in an RRC connection release message and sent to the UE. After receiving the second connection release message or the channel release message, the UE enters an idle state.

In another optional implementation manner, the 2G/3G base station may include the selected LTE frequency band information in redirection information and then include the redirection information in the second connection release message. Specifically, if the 2G/3G base station is a base station subsystem BSS in a 2G network, the 2G/3G base station includes the redirection information in a channel release message and sends the channel release message to the UE. If the 2G/3G base station is a radio network subsystem RNS in a 3G network, the 2G/3G base station includes the redirection information in an RRC connection release message and sends the RRC connection release message to the UE. After receiving the second connection release message or the channel release message, the UE enters an idle state.

In still another optional implementation manner, the 2G/3G base station may include the selected LTE frequency band information in priority information and then include the priority information in the second connection release message. Specifically, if the 2G/3G base station is a base station subsystem BSS in a 2G network, the 2G/3G base station includes the priority information in a channel release message and sends the channel release message to the UE. If the 2G/3G base station is a radio network subsystem RNS in a 3G network, the 2G/3G base station includes the priority information in a mobility information message and sends the mobility information message to the UE.

The first connection release message and the second connection release message mentioned in the specification of this application may be a radio resource (RR) connection release message, a radio resource control (RRC) connection release message, or another message used to help releasing a radio resource. If the 2G/3G base station is a BSS, the BSS sends an RR connection release message to the UE and includes redirection information or priority information in the RR connection release message, to instruct the UE to perform redirection and fall back to the LTE network after an RR connection is released. If the base station is an RNS, the RNS sends an RRC connection release message to the UE and includes redirection information in the message; or sends a mobility information message to the UE and includes priority information in the message, to instruct the UE to perform redirection and fall back to the LTE network after an RRC connection is released.

409: The UE selects and camps on a suitable cell according to the saved PLMN1 ID and the LTE frequency band information.

After releasing the current RR/RRC connection, the UE reselects a cell or selects a cell according to the LTE frequency band information delivered by the 2G/3G base station, that is, selects a cell in an LTE frequency band corresponding to the LTE frequency band information, selects a suitable cell according to the saved PLMN1 ID of the LTE network in which the UE is registered, and camps on the selected suitable cell. Optionally, if the UE already stores an EPLMN list, the UE may select a suitable cell according to the saved PLMN1 ID of the LTE network in which the UE is registered and the EPLMN list.

The suitable cell is a cell on which UE can camp and can acquire a normal service. In actual application, it may occur that UE cannot acquire a normal service (for example, can only acquire an emergency service) in a cell found in an LTE frequency band, that is, the found cell is a non-suitable cell. In this case, the UE may search for a suitable cell again in all frequency bands. However, this case is beyond consideration of this embodiment of the present invention and therefore is not described in detail.

410: The UE returns to the LTE network PLMN1 in which the UE is registered and initiates a joint location update process.

After selecting and camping on the suitable cell in the LTE network PLMN1, that is, the UE returns to the LTE network PLMN1 in which the UE is registered, to implement registration of the UE in the LTE network PLMN1, the UE initiates a joint location update process. Specifically, the joint location update process may be a joint TAU process.

According to the method for selecting an LTE network provided in this embodiment of the present invention, after UE initiates a CSFB process and falls back to a CS domain of a 2G/3G network, a first MSC/VLR sends a PLMN ID of an LTE network in which the UE is registered and instructs the UE to use a PLMN of the LTE network as a registered PLMN, and when the UE reselects an LTE cell or selects a cell after a CSFB service ends and according to LTE frequency band information delivered by a 2G/3G base station, the UE selects and camps on a suitable cell according to the saved PLMN of the LTE network, so as to ensure that the UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 5:
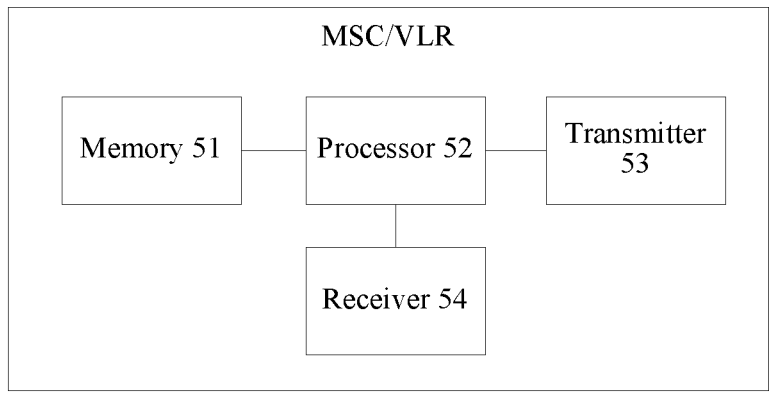
FIG. 5 is a schematic composition diagram of an MSC/VLR according to another embodiment of the present invention.

Another embodiment of the present invention provides an MSC/VLR. As shown in FIG. 5, the MSC/VLR includes a memory 51, a processor 52, a transmitter 53, and a receiver 54.

The receiver 54 is configured to acquire an identity of an LTE public land mobile network PLMN in which user equipment UE is registered.

The memory 51 is configured to store the identity, which is received by the receiver 54, of the LTE PLMN in which the UE is registered, where the MSC/VLR is an MSC/VLR that provides, after the UE falls back to a 2nd Generation/3rd Generation 2G/3G network from the LTE PLMN because of performing a circuit switched CS service, a service for the CS service.

The processor 52 is configured to: when generating a notification message, include the identity, which is stored in the memory, of the LTE PLMN in which the UE is registered in the notification message, and send the notification message to a transmitter.

The transmitter 53 is configured to receive the notification message sent by the processor 52, and send the notification message to the UE, where the notification message includes the identity of the LTE PLMN in which the UE is registered, and the MSC/VLR is a first MSC/VLR after the UE initiates a circuit switched fallback CSFB service in the LTE PLMN and falls back to the 2nd Generation/3rd Generation 2G/3G network.

The notification message is used to instruct the UE to select, according to the identity of the LTE PLMN, the LTE PLMN that the UE is to return to, and the LTE PLMN is used as a registered PLMN in the 2G/3G network.

Further, the receiver 53 is further configured to:

if the MSC/VLR is an MSC/VLR that provides a service for the UE in the LTE PLMN, acquire, by the MSC/VLR, the identity of the LTE PLMN from registration information of the UE; or if the MSC/VLR is not an MSC/VLR that provides a service for the UE in the LTE PLMN, acquire, by the MSC/VLR, the identity of the LTE PLMN from an MSC/VLR that provides a service for the UE in the LTE PLMN.

Further, the notification message generated by the processor 52 includes a location area identity LAI, and the LAI includes the identity of the LTE PLMN.

Further, the notification message generated by the processor 52 further includes indication information, and the indication information is used to instruct the UE to select, according to the identity of the LTE PLMN, the LTE PLMN that the UE is to return to.

Further, the notification message sent by the transmitter 53 includes a temporary mobile subscriber identity TMSI reallocation message, a location update accept message, or a mobility management message.

Further, the transmitter 53 sends the notification message to the UE in any one of the following cases:

after a signaling connection establishment request triggered by the CS service is received; or before it is learned that the CS service ends; or before a request of releasing a signaling connection established for the CS service is sent.

Further, if the receiver 54 receives, after the signaling connection is established, a location update request message sent by the UE, after sending the location update accept message, the transmitter 53 sends the notification message to the UE, where the location update accept message is a response message of the location update request message.

Further, the notification message generated by the processor 52 further includes an equivalent public land mobile network EPLMN list, and a PLMN in the EPLMN list is a PLMN equivalent to the LTE PLMN.

According to the MSC/VLR provided in this embodiment of the present invention, the MSC/VLR sends, to UE, a notification message including an identity of an LTE PLMN in which the UE is registered, so that after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 6:
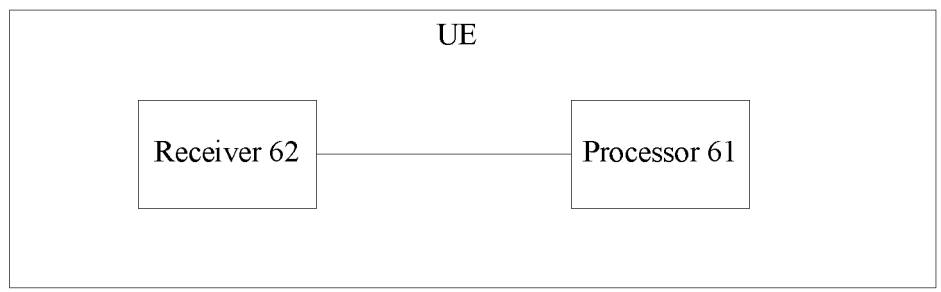
FIG. 6 is a schematic composition diagram of UE according to another embodiment of the present invention.

Another embodiment of the present invention provides UE. As shown in FIG. 6, the UE includes:

a processor 61, configured to fall back to a 2nd Generation/3rd Generation 2G/3G network from an LTE public land mobile network PLMN because of performing a circuit switched CS service; and a receiver 62, configured to receive, in the 2G/3G network, a notification message sent by a mobile switching center/visitor location register MSC/VLR, where the notification message includes an identity of the LTE PLMN, where the processor 61 is further configured to: after the receiver receives a connection release message, select, according to the identity of the LTE PLMN, the LTE PLMN that the UE is to return to, where the LTE PLMN is used as a registered PLMN in the 2G/3G network.

Further, the notification message received by the receiver 62 includes a location area identity LAI, and the LAI includes the identity of the LTE PLMN.

Further, the notification message received by the receiver 62 further includes indication information, and the indication information is used to instruct the UE to select, according to the identity of the LTE PLMN, the LTE PLMN that the UE is to return to.

Further, the notification message includes a temporary mobile subscriber identity TMSI reallocation message, a location update accept message, or a mobility management information message.

Further, the notification message received by the receiver 62 further includes an equivalent public land mobile network EPLMN list, and the EPLMN list includes an identity of a PLMN equivalent to the LTE PLMN; and the processor 61 is further configured to select, according to the identity of the LTE PLMN and the EPLMN list, the LTE PLMN that the UE is to return to.

Further, the processor 61 is further configured to add the identity of the LTE PLMN to the EPLMN list; and select, according to the identity of the LTE PLMN and the EPLMN list to which the identity of the LTE PLMN has been added, the LTE PLMN that the UE is to return to.

According to the UE provided in this embodiment of the present invention, the UE receives a notification message sent by an MSC/VLR and including an identity of an LTE PLMN in which the UE is registered, and after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 7:
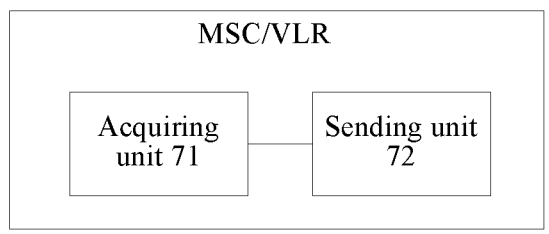
FIG. 7 is a schematic composition diagram of an MSC/VLR according to another embodiment of the present invention.

Another embodiment of the present invention provides an MSC/VLR. As shown in FIG. 7, the MSC/VLR includes:

an acquiring unit 71, configured to acquire an identity of an LTE public land mobile network PLMN in which user equipment UE is registered, where the MSC/VLR is an MSC/VLR that provides, after the UE falls back to a 2nd Generation/3rd Generation 2G/3G network from the LTE PLMN because of performing a circuit switched CS service, a service for the CS service; and a sending unit 72, configured to send a notification message to the UE, where the notification message includes the identity of the LTE PLMN, and the notification message is used to instruct the UE to select, according to the identity of the LTE PLMN, the LTE PLMN that the UE is to return to, where the LTE PLMN is used as a registered PLMN in the 2G/3G network.

Further, the acquiring unit 71 is specifically configured to:

if the MSC/VLR is an MSC/VLR that provides a service for the UE in the LTE PLMN, acquire, by the MSC/VLR, the identity of the LTE PLMN from registration information of the UE; or if the MSC/VLR is not an MSC/VLR that provides a service for the UE in the LTE PLMN, acquire, by the MSC/VLR, the identity of the LTE PLMN from an MSC/VLR that provides a service for the UE in the LTE PLMN.

Further, the notification message sent by the sending unit 72 includes a location area identity LAI, and the LAI includes the identity of the LTE PLMN.

Further, the notification message sent by the sending unit 72 further includes indication information, and the indication information is used to instruct the UE to select, according to the identity of the LTE PLMN, the LTE PLMN that the UE is to return to.

Further, the notification message sent by the sending unit 72 includes a temporary mobile subscriber identity TMSI reallocation message, a location update accept message, or a mobility management information message.

Further, the sending unit 72 sends the notification message to the UE in any one of the following cases:

after a signaling connection establishment request triggered by the CS service is received; or before it is learned that the CS service ends; or before a request of releasing a signaling connection established for the CS service is sent.

Further, the acquiring unit 71 is further configured to:

if a location update request message sent by the UE is received after the signaling connection is established, after the sending unit 72 sends the location update accept message, send the notification message to the UE, where the location update accept message is a response message of the location update request message.

Further, the notification message sent by the sending unit 72 further includes an equivalent public land mobile network EPLMN list, and a PLMN in the EPLMN list is a PLMN equivalent to the LTE PLMN.

According to the MSC/VLR provided in this embodiment of the present invention, the MSC/VLR sends, to UE, a notification message including an identity of an LTE PLMN in which the UE is registered, so that after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Figure 8:
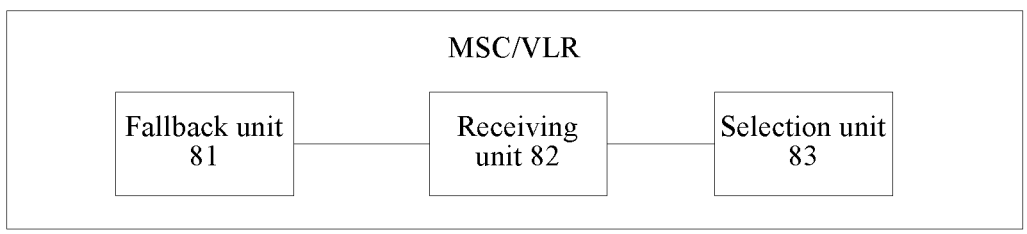
FIG. 8 is a schematic composition diagram of UE according to another embodiment of the present invention.

Another embodiment of the present invention provides UE. As shown in FIG. 8, the UE includes:

a fallback unit 81, falling back to a 2nd Generation/3rd Generation 2G/3G network from an LTE public land mobile network PLMN because of performing a circuit switched CS service;

a receiving unit 82, configured to receive, in the 2G/3G network, a notification message sent by a mobile switching center/visitor location register MSC/VLR, where the notification message includes an identity of the LTE PLMN; and a selection unit 83, configured to: after the receiving unit 82 receives a connection release message, select, according to the identity of the LTE PLMN, the LTE PLMN that the UE is to return to, where the LTE PLMN is used as a registered PLMN in the 2G/3G network.

Further, the notification message received by the receiving unit 82 includes a location area identity LAI, and the LAI includes the identity of the LTE PLMN.

Further, the notification message received by the receiving unit 82 further includes indication information, and the indication information is used to instruct the UE to select, according to the identity of the LTE PLMN, the LTE PLMN that the UE is to return to.

Further, a notification message received by the receiving unit 82 includes a temporary mobile subscriber identity TMSI reallocation message, a location update accept message, or a mobility management information message.

Further, the notification message received by the receiving unit 82 further includes an equivalent public land mobile network EPLMN list, and the EPLMN list includes an identity of a PLMN equivalent to the LTE PLMN; and the selection unit 83 is further configured to select, according to the identity of the LTE PLMN and the EPLMN list, the LTE PLMN that the UE is to return to.

Further, the receiving unit 82 is further configured to add, by the UE, the identity of the LTE PLMN to the EPLMN list; and the selection unit 83 is further configured to select, according to the identity of the LTE PLMN and the EPLMN list to which the identity of the LTE PLMN has been added, the LTE PLMN that the UE is to return to.

According to the UE provided in this embodiment of the present invention, the UE receives a notification message sent by an MSC/VLR and including an identity of an LTE PLMN in which the UE is registered, and after a CSFB service ends, the UE selects the LTE PLMN corresponding to the identity of the LTE PLMN included in the notification message. Compared with the method for falling back to an LTE network after CSFB, which is defined in the prior art, the method can ensure that UE returns to an LTE PLMN in which the UE is registered when CSFB is initiated, which not only reduces unnecessary inter-PLMN handover but also restores a data service suspended in an LTE PLMN in which the UE is registered before, thereby improving the service efficiency and user experience.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for selecting a Long Term Evolution (LTE) network, comprising:
    acquiring, by a mobile switching center/visitor location register (MSC/VLR), an identity of an LTE public land mobile network (PLMN) in which user equipment (UE) is registered, wherein the MSC/VLR is an MSC/VLR that provides a service for the CS service after the UE falls back to a 2nd Generation/3rd Generation (2G/3G) network from the LTE PLMN because of performing a circuit switched CS service; and
    sending, by the MSC/VLR, a notification message to the UE, wherein the notification message comprises the identity of the LTE PLMN and an equivalent public land mobile network EPLMN list, and the EPLMN list comprises an identity of a PLMN equivalent to the LTE PLMN, and the notification message is used to instruct the UE to select, according to the identity of the LTE PLMN and the EPLMN list, the LTE PLMN that the UE is to return to, wherein the LTE PLMN is used as a registered PLMN in the 2G/3G network.

2. The method according to claim 1, wherein the acquiring, by an MSC/VLR, an identity of an LTE PLMN in which UE is registered comprises:
    if the MSC/VLR is an MSC/VLR that provides a service for the UE in the LTE PLMN, acquiring, by the MSC/VLR, the identity of the LTE PLMN from registration information of the UE; or
    if the MSC/VLR is not an MSC/VLR that provides a service for the UE in the LTE PLMN, acquiring, by the MSC/VLR, the identity of the LTE PLMN from an MSC/VLR that provides a service for the UE in the LTE PLMN.

3. The method according to claim 1, wherein the notification message comprises a location area identity (LAI), and the LAI comprises the identity of the LTE PLMN.

4. The method according to claim 3, wherein the notification message further comprises indication information, and the indication information is used to instruct the UE to select, according to the identity of the LTE PLMN, the LTE PLMN that the UE is to return to.

5. The method according to claim 1, wherein the sending, by the MSC/VLR, a notification message to the UE comprises:
    after receiving a signaling connection establishment request triggered by the CS service, sending, by the MSC/VLR, the notification message to the UE; or
    before learning that the CS service ends, sending, by the MSC/VLR, the notification message to the UE; or
    before sending a request of releasing a signaling connection established for the CS service, sending, by the MSC/VLR, the notification message to the UE.

6. The method according to claim 5, wherein
    if the MSC/VLR receives, after the signaling connection is established, a location update request message sent by the UE, after sending the location update accept message, the MSC/VLR sends the notification message to the UE, wherein the location update accept message is a response message of the location update request message.

7. A method for selecting a Long Term Evolution (LTE) network, comprising:
    falling, by user equipment (UE), back to a 2nd Generation/3rd Generation (2G/3G) network from an LTE public land mobile network (PLMN) because of performing a circuit switched (CS) service;
    receiving, by the UE in the 2G/3G network, a notification message sent by a mobile switching center/visitor location register (MSC/VLR), wherein the notification message comprises an identity of the LTE PLMN and an equivalent public land mobile network EPLMN list, and the EPLMN list comprises an identity of a PLMN equivalent to the LTE PLMN; and
    after receiving a connection release message, selecting, by the UE according to the identity of the LTE PLMN and the EPLMN list, the LTE PLMN that the UE is to return to, wherein the LTE PLMN is used as a registered PLMN in the 2G/3G network.

8. The method according to claim 7, wherein the notification message further comprises indication information, and the indication information is used to instruct the UE to select, according to the identity of the LTE PLMN, the LTE PLMN that the UE is to return to.

9. The method according to claim 7, further comprising:
    adding, by the UE, the identity of the LTE PLMN to the EPLMN list; and
    the selecting, by the UE according to the identity of the LTE PLMN, the LTE PLMN that the UE is to return to comprises:
    selecting, by the UE according to the identity of the LTE PLMN and the EPLMN list to which the identity of the LTE PLMN has been added, the LTE PLMN that the UE is to return to.

10. A mobile switching center/visitor location register (MSC/VLR), comprising:
    a receiver, configured to acquire an identity of an LTE public land mobile network (PLMN) in which user equipment UE is registered;
    a memory, configured to store the identity, which is received by the receiver, of the LTE PLMN in which the UE is registered, wherein the MSC/VLR is an MSC/VLR that provides a service for the CS service after the UE falls back to a 2nd Generation/3rd Generation (2G/3G) network from the LTE PLMN because of performing a circuit switched (CS) service;
    a processor, configured to: when generating a notification message, comprise the identity, which is stored in the memory, of the LTE PLMN in which the UE is registered in the notification message, and send the notification message to a transmitter; and
    the transmitter, configured to receive the notification message sent by the processor, and send the notification message to the UE, wherein the notification message comprises the identity of the LTE PLMN in which the UE is registered and an equivalent public land mobile network EPLMN list, and the EPLMN list comprises an identity of a PLMN equivalent to the LTE PLMN, and the MSC/VLR is a first MSC/VLR after the UE initiates a circuit switched fallback (CSFB) service in the LTE PLMN and falls back to the 2G/3G network, wherein the notification message is used to instruct the UE to select, according to the identity of the LTE PLMN and the EPLMN list, the LTE PLMN that the UE is to return to, and the LTE PLMN is used as a registered PLMN in the 2G/3G network.

11. The MSC/VLR according to claim 10, wherein the receiver is further configured to:
- if the MSC/VLR is an MSC/VLR that provides a service for the UE in the LTE PLMN, acquire the identity of the LTE PLMN from registration information of the UE; or
- if the MSC/VLR is not an MSC/VLR that provides a service for the UE in the LTE PLMN, acquire, by the MSC/VLR, the identity of the LTE PLMN from an MSC/VLR that provides a service for the UE in the LTE PLMN.

12. The MSC/VLR according to claim 10, wherein the notification message generated by the processor further comprises indication information, and the indication information is used to instruct the UE to select, according to the identity of the LTE PLMN, the LTE PLMN that the UE is to return to.

13. The MSC/VLR according to claim 10, wherein the transmitter sends the notification message to the UE in any one of the following cases:
- after a signaling connection establishment request triggered by the CS service is received; or
- before it is learned that the CS service ends; or
- before a request of releasing a signaling connection established for the CS service is sent.

14. The MSC/VLR according to claim 10, wherein
- if the receiver receives, after the signaling connection is established, a location update request message sent by the UE, after sending the location update accept message, the transmitter sends the notification message to the UE, wherein the location update accept message is a response message of the location update request message.

15. User equipment (UE), comprising:
- a processor, configured to fall back to a 2nd Generation/3rd Generation (2G/3G) network from an LTE public land mobile network (PLMN) because of performing a circuit switched (CS) service; and
- a receiver, configured to receive, in the 2G/3G network, a notification message sent by a mobile switching center/visitor location register (MSC/VLR), wherein the notification message comprises an identity of the LTE PLMN and an equivalent public land mobile network EPLMN list, and the EPLMN list comprises an identity of a PLMN equivalent to the LTE PLMN, wherein
- the processor is further configured to: after the receiver receives a connection release message, select, according to the identity of the LTE PLMN and the EPLMN list, the LTE PLMN that the UE is to return to, wherein the LTE PLMN is used as a registered PLMN in the 2G/3G network.

16. The UE according to claim 15, wherein the notification message received by the receiver comprises a location area identity LAI, and the LAI comprises the identity of the LTE PLMN.

17. The UE according to claim 15, wherein the notification message received by the receiver further comprises indication information, and the indication information is used to instruct the UE to select, according to the identity of the LTE PLMN, the LTE PLMN that the UE is to return to.

18. The UE according to claim 15, wherein the processor is further configured to add the identity of the LTE PLMN to the EPLMN list; and
- select, according to the identity of the LTE PLMN and the EPLMN list to which the identity of the LTE PLMN has been added, the LTE PLMN that the UE is to return to.

* * * * *